United States Patent [19]
Joly et al.

[11] Patent Number: 5,363,700
[45] Date of Patent: Nov. 15, 1994

[54] SKEWED AXIS INERTIAL SENSOR ASSEMBLY

[75] Inventors: Lucien E. Joly, Cook; Michael A. Knipfer, Maple Grove; Michelle J. Miller, Minneapolis, all of Minn.; George O. Nitzschke, St. Petersburg, Fla.; Mark T. Weinberger, Mounds View, Minn.

[73] Assignee: Honeywell Inc., Minneapolis, Minn.

[21] Appl. No.: 977,319

[22] Filed: Nov. 17, 1992

[51] Int. Cl.$^5$ ............................ G01P 9/02; G01P 1/02
[52] U.S. Cl. ........................................ 73/504; 73/431; 73/510
[58] Field of Search ............... 73/504, 510, 493, 866.5, 73/178 R, 431; 74/5.34; 364/453; 356/350

[56] References Cited

U.S. PATENT DOCUMENTS

| | | | |
|---|---|---|---|
| D. 317,132 | 5/1991 | Knipfer et al. | D10/65 |
| 3,269,179 | 8/1966 | Anderson | 33/178 |
| 3,403,874 | 10/1968 | Boskovich et al. | 244/77 |
| 3,463,909 | 8/1969 | Weiss | 235/150.25 |
| 3,489,004 | 1/1970 | Barnhill et al. | 73/178 |
| 4,020,702 | 5/1977 | Epstein | 74/5.34 |
| 4,125,017 | 11/1978 | Dhuyvetter et al. | 73/178 |
| 4,179,818 | 12/1979 | Craig | 33/321 |
| 4,212,443 | 7/1980 | Duncan et al. | 244/177 |
| 4,601,206 | 7/1986 | Watson | 73/514 |
| 4,675,820 | 6/1987 | Smith et al. | 364/453 |
| 4,711,125 | 12/1987 | Morrison | 73/178 |
| 4,747,317 | 5/1988 | Lara | 73/865.8 |
| 4,795,258 | 1/1989 | Martin | 356/350 |
| 4,825,716 | 5/1989 | Roberts et al. | 74/5.34 |
| 5,088,825 | 2/1992 | Derry et al. | 356/350 |

OTHER PUBLICATIONS

"Redundant Strapdown Inertial Reference Unit (SIRU)", Gilmore et al., Journal of Spacecraft, vol. 9, #1, Jan. 1972, pp. 39–47.
"Current Sperry Laser Gyros", SG-99-0037, Sep. 1976.
"Fault Tolerant Highly Reliable Inertial Navigation System", Jeerage et al., Honeywell Inc., 5 pages.

Primary Examiner—John E. Chapman
Assistant Examiner—Helen C. Kwok
Attorney, Agent, or Firm—Robert A. Pajak

[57] ABSTRACT

In the present invention six gyros and six accelerometers are mounted to a support frame generally comprised of a block of a selected material. The relationship of each input axis of each of the gyros and accelerometers is selected to permit all of the sensors to be mounted on the block so as to provide minimal size and weight of the combination of the block and the six gyros and six accelerometers. More specifically, first, second and third pairs of gyros (totaling six gyros) and six accelerometers are mounted to the block such that the input axis of each gyro and accelerometer is in non-colinear alignment with any other input axis, and that the input axes of the first, second, and third pairs of gyros intersect at mutually exclusive first, second, and third intersection points, and such that each input axis of all six of the accelerometers intersect at a common accelerometer intersection point, and wherein the first, second, and third gyro intersection points and the accelerometer intersection point lie in a plane which is substantially a plane of symmetry of the combination of the block, the six gyros, and the six accelerometers.

16 Claims, 10 Drawing Sheets

SKEWED AXIS INERTIAL SENSOR ASSEMBLY

BACKGROUND OF THE INVENTION

The present invention relates to a skewed axis inertial sensor assembly for supporting a plurality of gyros and accelerometers. More specifically, the present invention relates to an inertial sensor assembly for providing a redundant strap down system including six gyroscopes and six accelerometers arranged with their input axis in a particular relationship.

Use of redundant strap down inertial reference units in both commercial aviation and space applications is well known in the art. Redundancy concepts are intended to achieve significant improvement in reliability, and thus enhance mission success. Generally, a redundant strap down inertial navigation system utilizes two or three discrete inertial reference units. Each inertial reference unit generally includes a discrete inertial sensor apparatus for producing sensor data, and associated electronics for signal processing and generation of inertial reference data. Inertial sensor apparatuses generally include three discrete gyros and three discrete accelerometers for the production of necessary data required for producing inertial reference and/navigational information. All three gyros and all three accelerometers and their respective electronics must be operative in an inertial reference unit, as described, to produce complete inertial reference data.

Many navigational systems of prior art aircraft utilize three redundant inertial reference units, similar to that just described, and therefore would include a total of nine gyros and nine accelerometers. In such systems, it should be understood that any one sensor of the combination of three gyros and three accelerometers in the inertial reference unit results in the failure of the inertial reference unit—i.e., the output data therefrom is no longer valid.

Another inertial reference system having redundant inertial reference unit capability was proposed and described in a paper entitled, "A Redundant Strap Down Inertial Reference Unit (SIRU)", by Gerald P. Gilmore, et al, *Journal of Spacecraft and Rockets*, Vol. 9, No. 1, January 1972, pages 39–47. The Gilmore system is comprised of six gyros having their input axis skewed relative to each other in accordance with a specific relationship, and six accelerometers having their input axis skewed relative to each other in accordance with a specific relationship. This six gyro/six accelerometer redundant inertial reference system provides a fail operative to two failures and fail safe to the third failure operative system.

In the Gilmore, et al, publication, six gyros and six accelerometers are arranged with each input axis thereof in alignment with a symmetrical pattern that corresponds to the normal to faces of a dodecahedron. Each of the gyros and accelerometers are separately packaged with its calibrated electronics in a module and mounted to a "π-frame". This configuration enables data processing with self contained failure isolation for up to two out of six of either sensor type, and continued operation with as many as three out of six failures of the same failure type.

The Gilmore, et al, system provides what is sometimes referred to as a fault tolerant inertial navigation system which is highly reliable. The failure detection and isolation of such a system is described in a paper entitled, "Fault Tolerant Highly Reliable Inertial Navigational System", by Mahesh Jeerage, et al, IEEE PLANS, 1956, pp 456–460.

SUMMARY OF THE INVENTION

In the present invention six gyros and six accelerometers are mounted to a support frame generally comprised of a block of a selected material. The relationship of each input axis of each of the gyros and accelerometers is selected to permit all of the sensors to be mounted on the block so as to provide minimal size and weight of the combination of the block and the six gyros and six accelerometers.

In the preferred embodiment of the invention, three pairs of gyros are positioned so that each pair of gyros has the extension of its respective input axis intersect at an intersection point different than the other two pairs of gyros. The structural configuration of the block is selected such that there exists a single plane of substantial symmetry which passes through the block including the symmetrical positioning of the six gyros and six accelerometers, and in which the intersection points of the gyro pairs lie in the plane of symmetry.

DETAIL DESCRIPTION OF THE INVENTION

Referring to FIGS. 1a–e, there is shown a block 10 serving as a support frame for mounting six gyros and six accelerometers thereto. Block 10 is comprised of a block of a structurally rigid material, for example, aluminum which is formed or machined to provide a plurality of apertures including mounting means for selectively mounting a gyro or accelerometer as will be subsequently described.

Figure 4:
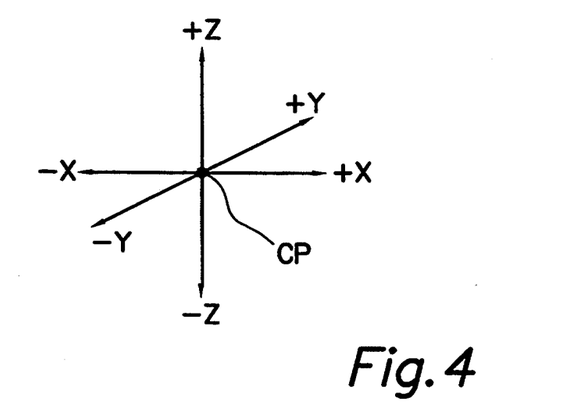
FIG. 4 illustrates a right hand XYZ coordinate system.

In order to assist the reader in understanding the invention, accompanying each of FIGS. 1a–e is a right hand rectangular coordinate system reference, like that illustrated in FIG. 4, which will be more specifically be referred to in the exposition which follows.

Figure 2:
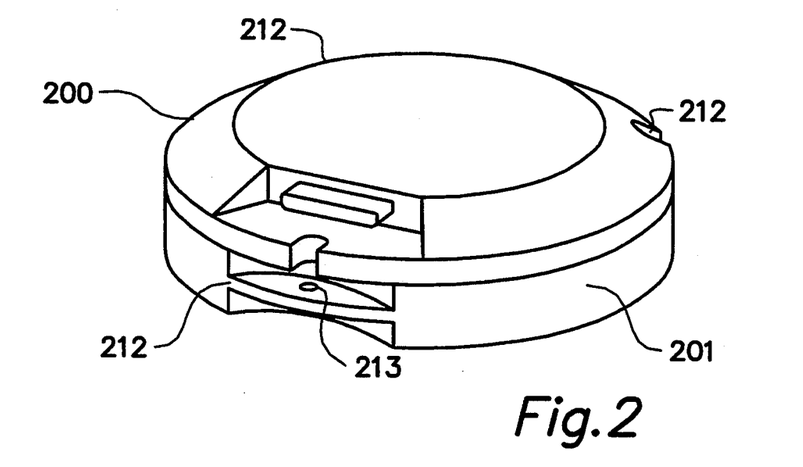
FIG. 2 is diagrammatic representation of a prior art gyro housing structure.

The six gyro receiving apertures, 110, 120, 130, 140, 150, and 160 are generally configured to receive a selected gyro 200 illustrated in FIG. 2. In the preferred embodiment of the invention, the gyro receiving apertures are configured to receive a gyro 200 having a substantially circular housing 201 as particularly illustrated in FIG. 2, and claimed in design patent DE 317,132 issued to M. A. Knipfer, et al for housing a ring laser gyro as particularly described in U.S. Pat. No. 5,088,825 issued to R. W. Derry, et al. Gyro housing 201 generally includes three mounting tabs 212 having apertures 213.

Block 10 includes three mounting members shown as bosses 12 formed or machined in the proximity of each of the gyro receiving apertures for mounting the gyros to block. Each mounting member 12 includes a threaded aperture 13. Each mounting member 12 and threaded aperture 13 are structurally positioned to mate with gyro housing tabs 212 and gyro housing tab apertures 213, thereby permitting the gyro housing 201 to be rigidly secured to block 10 by means of a bolt, or other fastening technique. It should be recognized that the three mounting members define a gyro mounting plane, which therefore defines the orientation of the gyro input axis of the gyro mounted thereto.

In the preferred embodiment of the invention, the gyro receiving apertures are intended only to be large enough to accommodate the gyro housing 201, and the depth of the aperture of each gyro receiving aperture is intended to be sufficiently deep so that the gyro housing 201 has at least a portion thereof recessed within block 10. As is well known in the art, a helical coil (not shown) may be inserted into the threaded apertures 13 for obtaining more mechanically sound and reliable threads in an aluminum block.

Figure 1A:
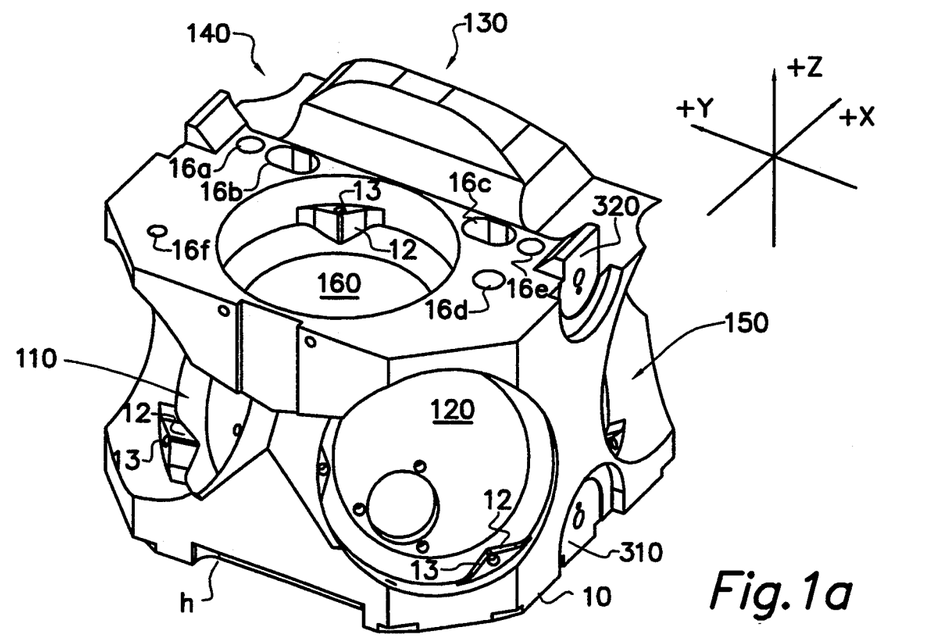
FIGS. 1a–e are isometric drawings illustrating the support frame for the inertial sensor assembly in accordance with the present invention.
Figure 1B:
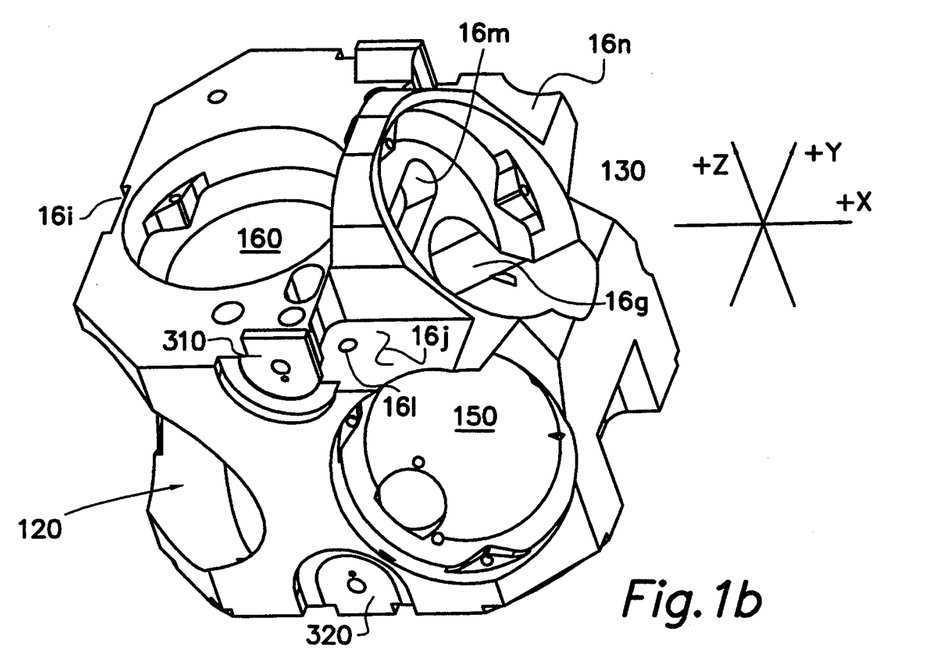
Figure 1C:
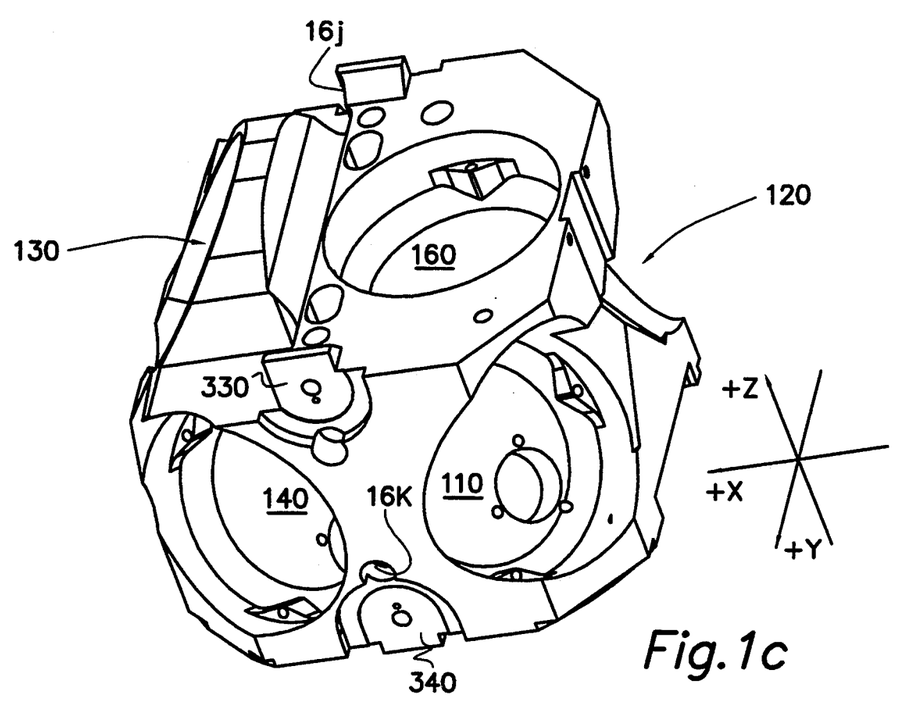
Figure 1D:
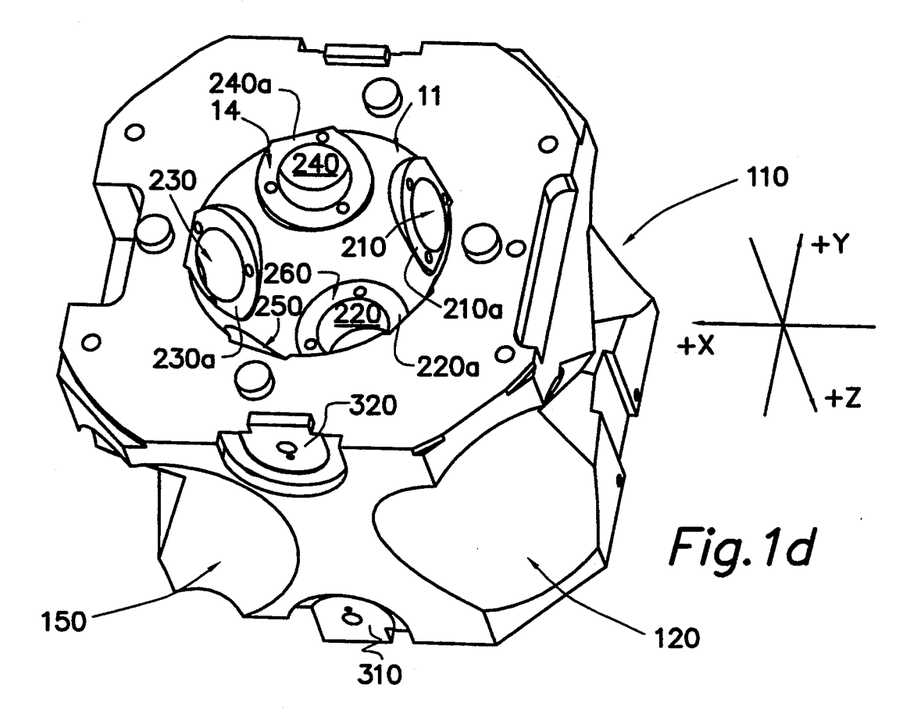
Figure 1E:
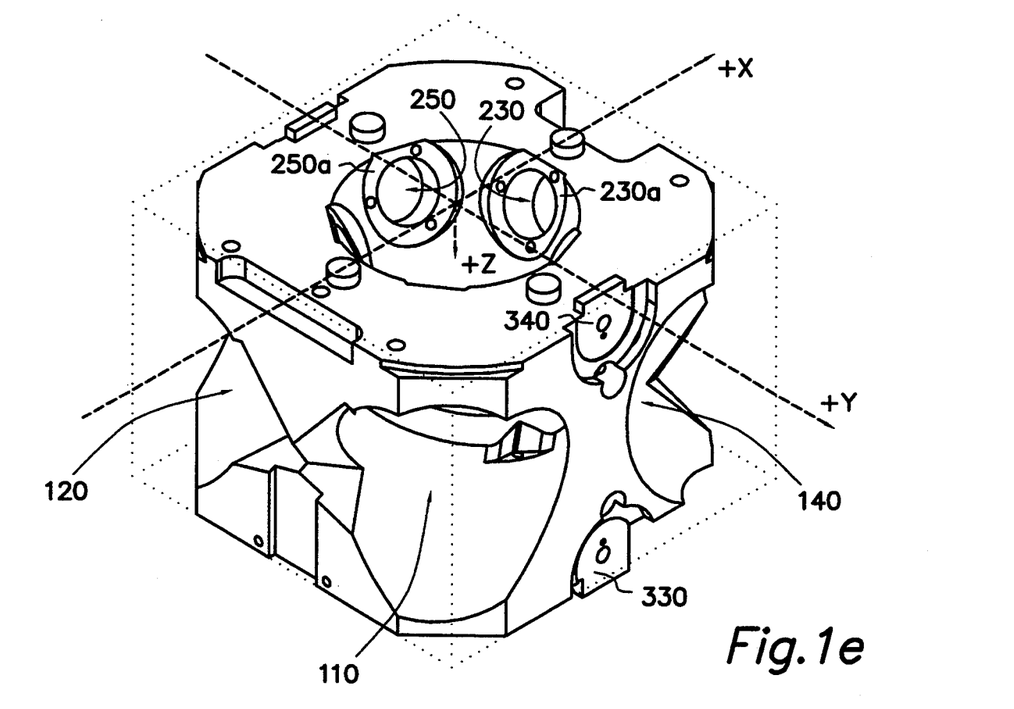

As more particularly illustrated in FIG. 1d, block 10 further includes a conically shaped aperture 11 for subsequent machining and/or processing to form accelerometer receiving apertures and mounting surfaces for accelerometers A1, A2, A3, A4, A5, and A6. Similar to the gyro receiving apertures, six accelerometer receiving apertures, 210, 220, 230, 240, 250, and 260 are generally configured to receive a selected accelerometer structure. In the preferred embodiment of the invention, the accelerometer receiving apertures are configured to receive an accelerometer 300, as particularly illustrated in FIG. 3, having a substantially right circular cylindrical accelerometer housing 310 including a mounting flange 312, having apertures 314. An example of accelerometer 300 is one, among others, manufactured by Sunstrand Data Control, Inc, Model No. QA3000 or the like.

Apertures 210, 220, 230, 240, 250, and 260, are generally illustrated in the Figures to accommodate the accelerometer's long cylindrical housing portion 310. Surrounding block 10 apertures 210, 220, 230, 240, 250, and 260, are mounting surfaces to mate with the accelerometer mounting flange 312. In the drawing, a second larger diameter aperture, 210a, 220a, 230a, 240a, 250a, and 260a, each having a recessed planar mounting surface to accommodate and mate with flange 312. Each of the latter planar mounting surfaces further includes three threaded apertures 14 structurally positioned to mate with accelerometer housing apertures 314, thereby permitting the accelerometer housing 310 to be rigidly secured to block 10 by means of a plurality of bolts (not shown), or other fastening technique, similar to mounting of the gyros.

Similar to the gyro mounting technique, the planar mounting surfaces of block 10 which accommodate the accelerometer mounting flange 312 define an accelerometer mounting plane, which therefore defines the orientation of the accelerometer input axis mounted thereto.

In the preferred embodiment of the invention, the accelerometer receiving apertures are intended only to be large enough to accommodate the accelerometer housing 310, and the depth of the aperture of each accelerometer receiving aperture is intended to be sufficiently deep so that the accelerometer housing portion 310a is recessed within block 10, and that the flange 312 makes contact with block 10 in a precise manner so as to selectively define the orientation of the accelerometer input axis.

Other types of gyro and accelerometer structures and mounting schemes are intended to be within the scope of the present invention. Of course, an object of the present invention is to provide an inertial sensor assembly which is compact, highly reliable, and permit removing any one of the gyro and accelerometer sensors without the necessity for removing any others, thereby permitting convenient field replacement of the sensors.

The support frame as just described provides a means for mounting the gyros and accelerometers in accordance with a predetermined relationship between each input axis of each of the gyros and accelerometers. In the description which follows, it should be recognized that the 3 point mounting apertures for both the gyros and accelerometers define a sensor mounting plane, and the input axis of the sensor being perpendicular to the sensor mounting plane.

The sensor input axis relationships are particularly illustrated in FIGS. 4–7 as will now be described. For purposes of understanding the invention, it is assumed that the peripheral portions of the block 10, forming the sensor support frame as just described, surrounds a coordinate reference point CP of a right hand orthogonal XYZ coordinate system, illustrated in FIG. 4, including ±X, Y, Z, reference axes passing through the coordinate reference point CP. Accordingly, the XYZ coordinate system includes three orthogonal planes passing through the coordinate reference point CP, specifically the XY plane, the YZ plane, and the XZ plane as is well understood.

Figure 5:
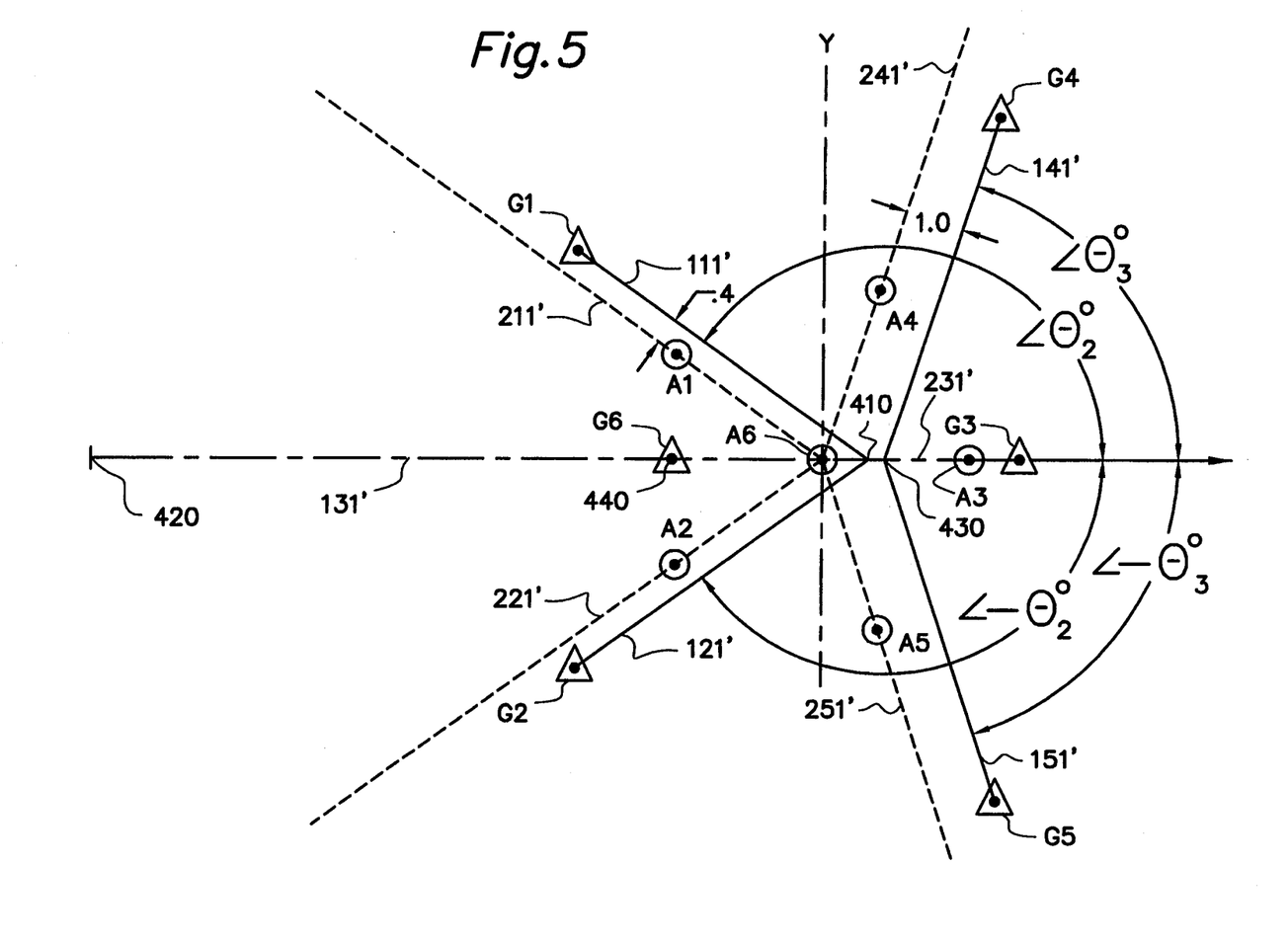
FIG. 5 is a diagrammatic representation of the preferred embodiment of the invention of the inertial sensor assembly illustrating the perpendicular projection onto the XY plane of the input axis of each of the gyro and accelerometer sensors mounted to the support frame of FIG. 1.

FIG. 5 illustrates a view looking down the Z axis which illustrates the projection on the XY plane of the coordinate system of FIG. 4 for purposes of illustrating the relationship between each accelerometer and gyro input axis. More specifically, FIG. 5 illustrates the extension of the gyro input axis projected perpendicularly onto the XY plane. Further the perspective illustrated in FIG. 5 is such that the +Z axis is coming out of the view toward the viewer, and that the YZ plane is in parallel with and includes the +Z axis.

Figure 6A:
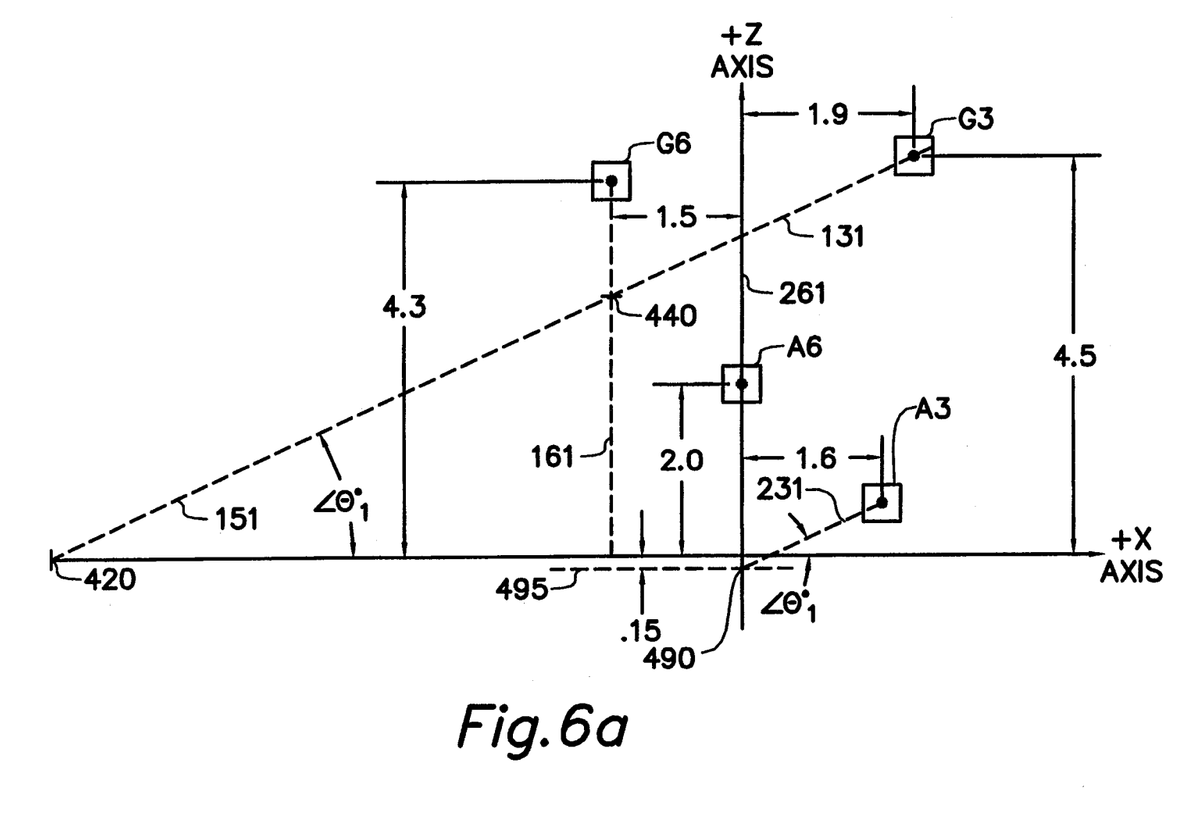
FIGS. 6a–c are diagrammatic representations of the preferred embodiment of the invention illustrating the orientation of the input axis of selected ones of the gyro and accelerometer sensors of the inertial sensor assembly relative to the XY plane.
Figure 6B:
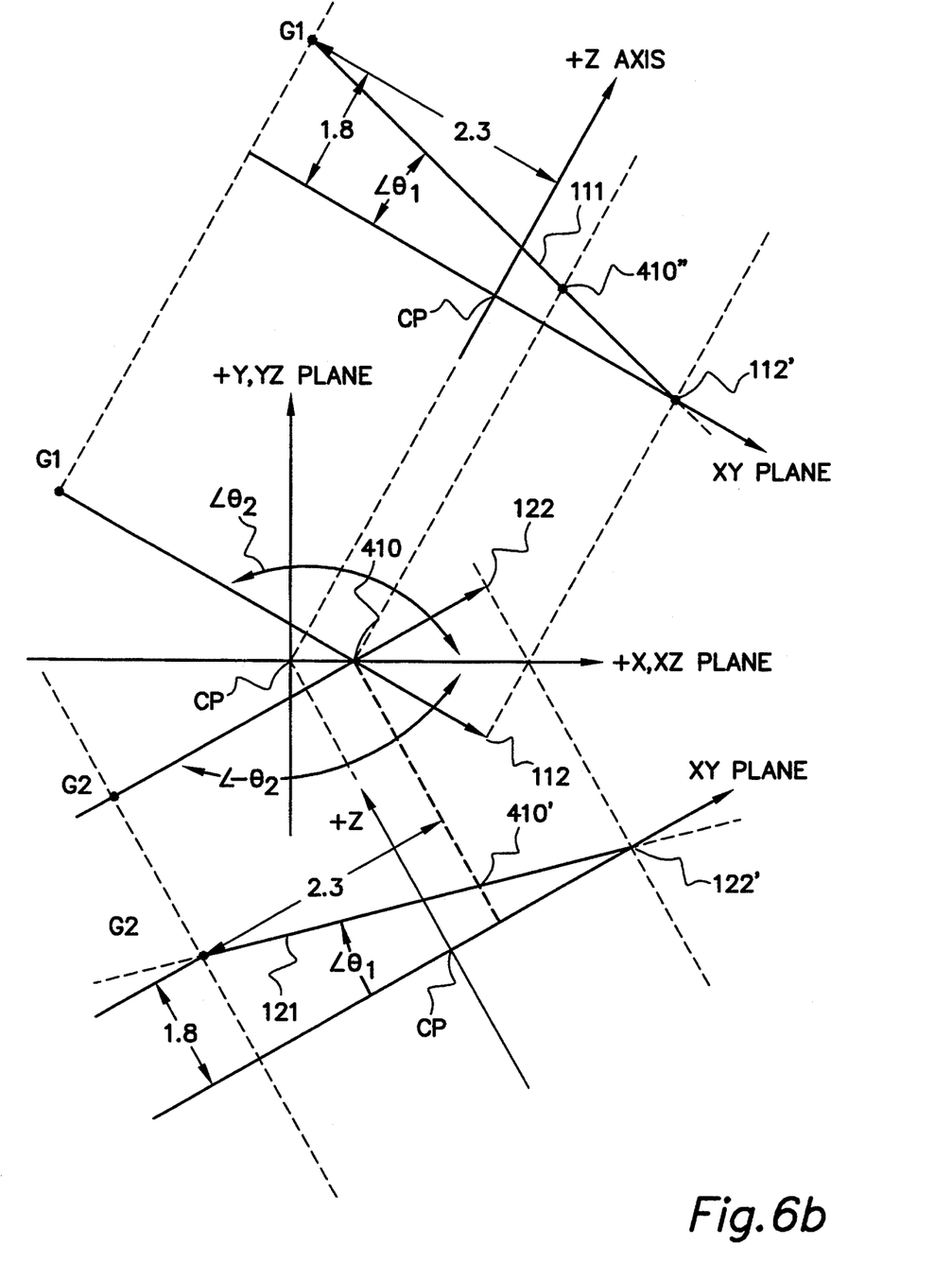
Figure 6C:
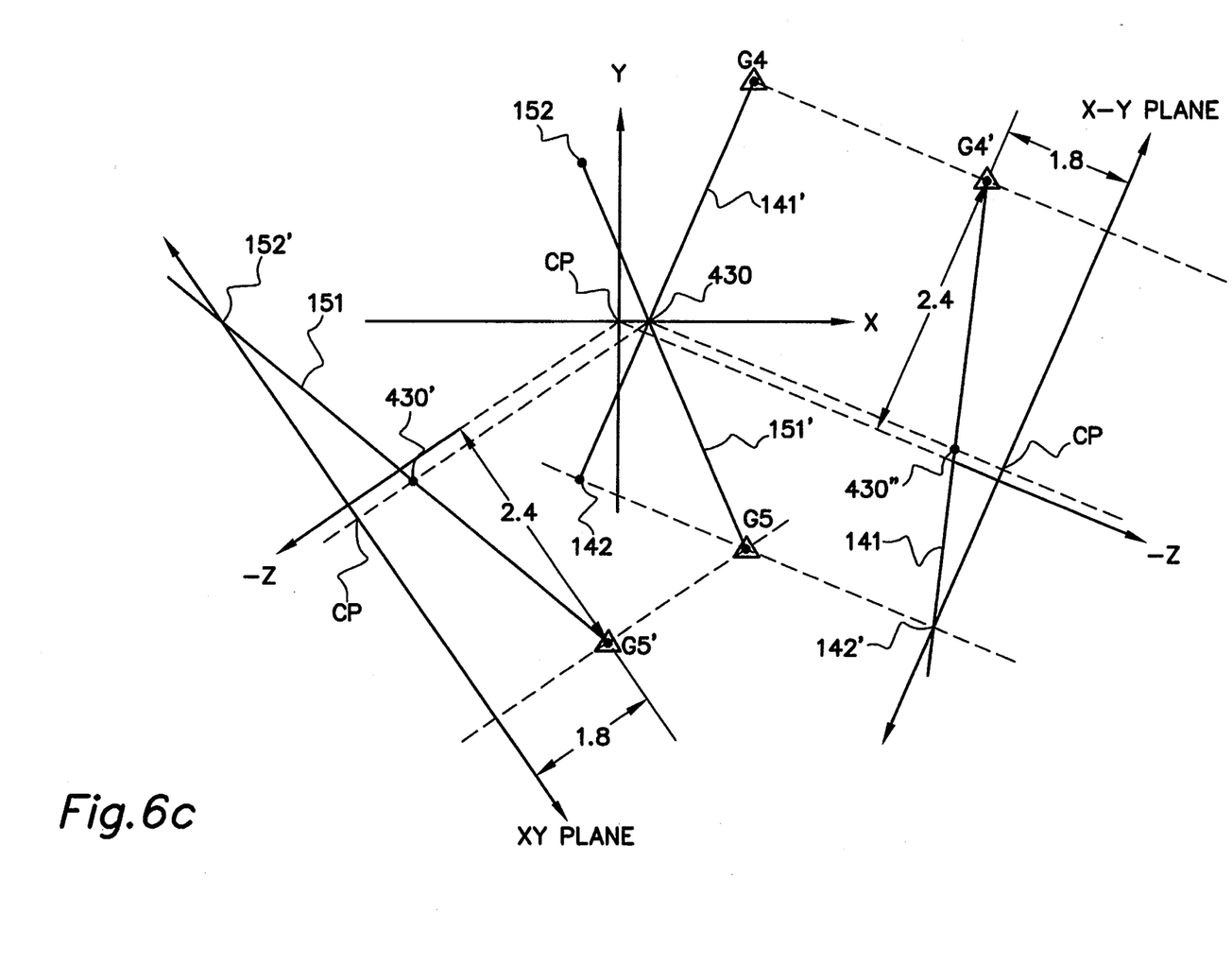

FIG. 6a illustrates the angular relationship of each input axis of gyros G3 and G6, and accelerometers A3 and A6 relative to the XY plane, and also the XZ plane. FIGS. 6b and 6c illustrate the angular relationship of each input axis, along with auxiliary views, of the remaining gyros G1, G2, G4, and G5 relative to the XY plane. More specifically, FIGS. 6b and 6c include diagrammatic representations of a view of a plane passing through the gyro input axis and perpendicular to the XY plane, as will be more fully described.

Gyro Position

Referring now to FIGS. 1a–e and FIGS. 5–7, a first pair gyros, G1 and G2, are mounted to the block 10 in apertures 110 and 120, respectively, such that they are spaced apart from the XY plane in the +Z axis direction therefrom and spaced apart from the YZ plane in the −X axis direction therefrom. The extension of the gyro G1 input axes 111 and the gyro G2 input axis 121, respectively, intersect the XY plane at points 112 and 122, respectively, and intersect each other at an intersection point 410, and both are at a first selected angle, $\theta_1$ relative to the XY plane. The perpendicular projection of gyro input axes 111 and 121 onto the XY plane are illustrated in FIG. 5 as lines 111' and 121', respectively. Gyro G1 is positioned such that the angle formed by the X axis and the line projection 111' measured in a counter-clockwise direction from the +X axis is a second selected angle, $\theta_2$. Gyro G2 is positioned such that the angle formed by the X axis and the line projection 121' measured in a clockwise direction from the +X axis is also equal to the second selected angle, $\theta_2$.

It should be noted that FIG. 6b illustrates, using standard engineering drawing techniques, separate views of a plane passing through the G1 gyro input axis and the G2 gyro input axis. This permits the observer to visualize the angle $\theta_1$ between the gyro input axis and the XY plane. Further, it illustrates that the intersection point 410 is in the XZ plane, away from the XY plane in the +Z axis, and that the intersection points 112 and 122 lie in the XY plane.

Similar to FIG. 6b, FIG. 6c illustrates separate views of the a plane passing through the G4 gyro input axis and the G5 gyro input axis. This permits the observer to visualize the angle $\theta_1$ between the gyro input axis and the XY plane. As illustrated, a second pair of gyros, G4 and G5, are mounted to block 10 in apertures 140 and 150, respectively, such that they are spaced apart from the XY plane in the +Z axis direction therefrom and spaced apart from the YZ plane in the −X axis direction therefrom. As shown in FIG. 6c, the extension of the gyro G4 input axes 141, and the extension of gyro G5 input axis 151, respectively, intersect the XY plane at points 142 and 152, respectively, and intersect each other at an intersection point 430, and both are at a first selected angle, $\theta_1$ relative to the XY plane. The perpendicular projection of gyro input axes 141 and 151 onto the XY plane are illustrated in FIG. 5 as lines 141' and 151', respectively. Gyro G4 is positioned such that the angle formed by the X axis and the line projection 141' measured in a counter-clockwise direction from the +X axis is a third selected angle value, $\theta_3$. Gyro G5 is positioned such that the angle formed by the X axis and the line projection 151' measured in a clockwise direction from the +X axis is also equal to the third selected angle value, $\theta_3$.

Referring more particularly to FIG. 6a which depicts the XZ plane, gyro G3 is mounted to block 10 in aperture 130 which is spaced apart from the XY plane in the +Z axis direction therefrom and spaced apart from the YZ plane in the +X axis direction therefrom. Gyro G3 is oriented such that the Is extension of its input axis 131 intersects the X axis at intersection point 420. Like gyros G1, G2, G4, and G5, gyro G3 is at an angle $\theta_1$ relative to the XY plane and lies in the XZ plane, as particularly illustrated in FIG. 6a.

Lastly, as is also illustrated in FIG. 6a, gyro G6 is mounted to block 10 in aperture 160 which is spaced apart from the XY plane in the +Z axis direction therefrom and spaced apart from the YZ plane in the −X axis direction therefrom. Gyro G6 is oriented such that its input axis 161 is in parallel with the Z axis, lies in the XZ plane, and intersects the extension of gyro G3 input axis 131 at an intersection point 440.

Shown also in FIGS. 6a–c are the dimensional relationships relative to the XYZ coordinate system of a fictitious reference point, herein referred to as the "sensor center point" for the individual gyro and accelerometer sensors through which the sensor input axis passes therethrough and lies on the mounting plane defined by either the block bosses 12 for mounting the gyros, or the planar mounting surfaces recessed within in the accelerometer apertures 210a, 220a, etc, for mounting the accelerometers. As should be recognized by those skilled in the art, the sensor mounting plane defines the angle of the sensor input axis relative to the XYZ coordinate frame. The dimensions as shown will define the sensor center point of the mounting plane of the sensor and lies on the sensor's input axis. The dimensions as will now be described are rough dimensions for appreciating the present invention. The dimensions are only descriptive for a block for mounting gyros where the gyro housing 201 has approximate dimensions of a 3.5 inch housing diameter and a height of 1.8 inches, and accelerometers having approximate dimensions of a 1.5 inch housing 310 diameter and a height of 1.0 inches, and a flange 312 diameter of 1.50 inches.

Again referring to FIGS. 6a–c, the mounting sensor center point of gyros G1 and G2 are 1.8" in the +Z direction, and 2.3" away from the Z axis. The mounting sensor center point of gyro G3 is 4.5" in the +Z direction, and 1.9" from the Z axis. The mounting sensor center points of gyros G4 and G5 are 1.8" from the XY plane and 2.4" away from the Z axis. Lastly, mounting sensor center point of gyro G6 is 4.3" in the +Z direction and 1.5" away from the Z axis. The dimensions of the positions of the gyros as just described permits the sensor center points of the gyro sensors to lie within a substantial cube having less than 6 inches on a side as particularly illustrated in FIG. 1e.

Accelerometer Position

As already described, block 10 also includes accelerometer receiving apertures 210, 220, 230, 240, 250, and 260 for mounting accelerometers A1, A2, A3, A4, A5, and A6, respectively. Surrounding the accelerometer receiving apertures are three threaded holes 14 for mounting the accelerometers within the accelerometer receiving apertures. Like the threaded apertures 13, a helical coil may be inserted into the threaded apertures 14 for obtaining more reliable and mechanically sound threads in an aluminum block, as before, in a manner well known in the art.

Figure 7:
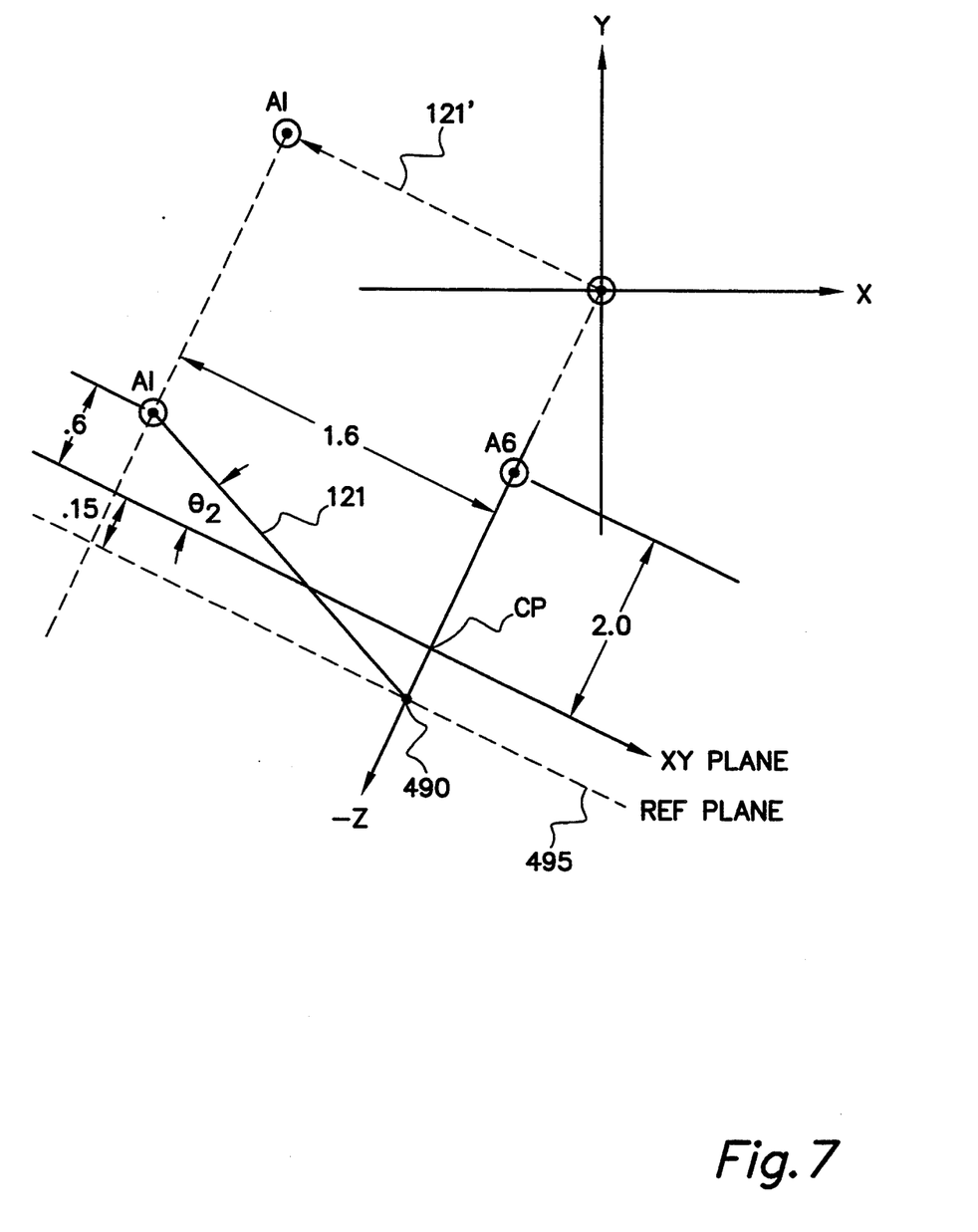
FIG. 7 is a diagrammatic representation of the preferred embodiment of the invention illustrating the orientation of the input axis of selected ones of the accelerometer sensors of the inertial sensor assembly relative to the XY plane.

The placement of the accelerometers mounted to block 10 is geometrically depicted in FIGS. 5, 6a, and 7, referenced, as before, to the same Cartesian coordinate system as illustrated in FIG. 4. FIG. 5 particularly shows the relationship of the projections of the input axis of all gyros and accelerometers.

Referring now more particularly to FIG. 5, the orientation of the perpendicular projection onto the XY plane of each accelerometer input axis is aligned with a corresponding one of the gyros. That is, the projection of each accelerometer input axis is in parallel with the projection of a corresponding gyro input axis. More specifically, the perpendicular projection onto the XY plane of the accelerometer A1 input axis 211, designated 211', is in parallel with the gyro G1 line projection 111', the accelerometer A2 input axis 221, designated 221', is in parallel with the gyro G2 line projection 121', the accelerometer A4 input axis 241, designated 241', is in parallel with the gyro G4 line projection 141', and the accelerometer A5 input axis 251, designated 251', is in parallel with the gyro G5 line projection 151'.

Further, the perpendicular projection onto the XY plane of the accelerometer A3 input axis 231, designated 231', lies on the +X axis in parallel with the gyro G3 line projection 131'. Lastly, the perpendicular projection onto the XY plane of accelerometer A6 input axis 261 lies on the Z axis in parallel with the gyro G6 input axis 161. The latter description is readily seen as illustrated in FIG. 6a.

The accelerometers A1, A2, A3, A4, A5, and A6 are positioned on the block 10 such that each accelerometer input axis 211, 221, 231, 241, 251, and 261 intersect at a common accelerometer intersection point 490 located on the Z axis. Since each accelerometer input axis is parallel to a corresponding gyro input axis, except A6, as aforesaid, the extension of each accelerometer input axis is at an angle $\theta_2$ relative to the XY plane, and also relative to a reference plane, referred to as the intersection plane 495 which is parallel to the XY plane and passes through the common accelerometer intersection point 490.

The dimensional position of the accelerometers mounted to the block 10 relative to the Cartesian coordinate system identified in FIG. 4 will now be described with respect to FIGS. 6a and 7. FIG. 7 is similar to FIG. 6b in that it represents a view of a plane passing through the accelerometer input axis where the XY plane is perpendicular to the viewer, but the X and Y axis cannot be viewed. In FIG. 7, only the A1 accelerometer input axis 211 is illustrated, since the drawing would be similar for the remaining accelerometers A2, A3, A4 and A5. This is so since the input axis of these accelerometers all pass through the common center point 490 and are at the same angle $\theta_1$ relative to the XY plane. This is further illustrated in FIG. 6a which illustrates the XZ plane passing through the A3 and A6 accelerometer input axis 231 and 261, respectively.

As illustrated, accelerometers A1, A2, A3, A4 and A5 have a sensor center point which is spaced apart 0.6" from the XY plane in the +Z axis direction, and spaced apart 1.6" away from the Z axis. With these dimensions, the common accelerometer intersection point of the extension of each accelerometer input axis is below the XY plane approximately 0.15" in the −Z axis direction. In the preferred embodiment of the invention, the accelerometers, A1, A2, A3, A4, A5, and A6 are all mounted to the block 10 above the intersection plane 495 with accelerometers A1, A2, A3, A4, and A5 being equidistant from the common center point 490, and where the A6 accelerometer lies on the Z axis approximately 2 inches above the XY plane.

Figure 8:
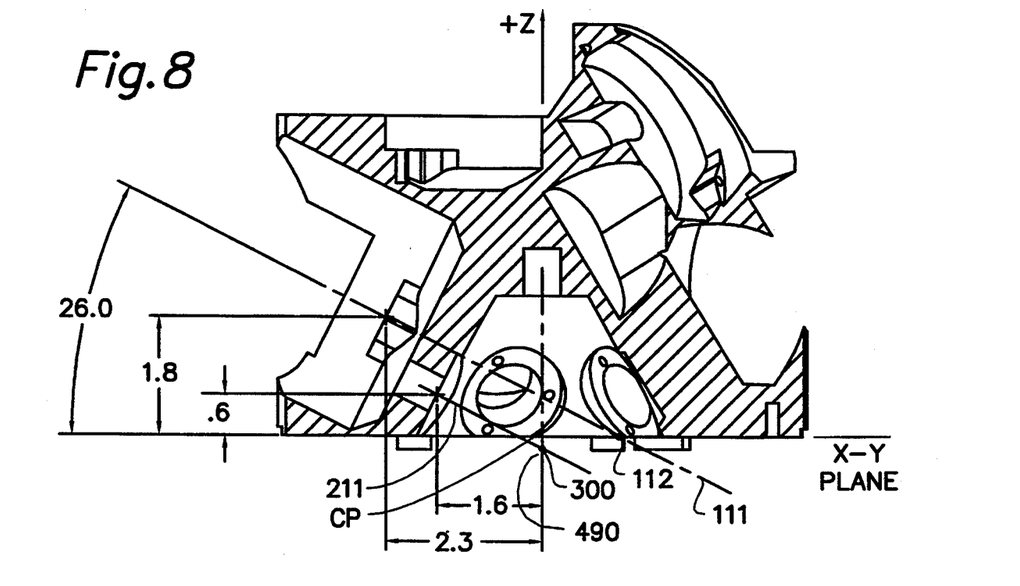
FIG. 8 is a cross-sectional view of one portion of FIG. 1 illustrating the physical relationship of a gyro and accelerometer.

In order to visualize the compact arrangement of the support frame provided by block 10 in accordance with the present invention, the relationship of a single pair of sensors, for example G1 and A1 is illustrated in FIG. 8. FIG. 8 illustrates a view of a plane passing through the G1 gyro input axis 111 and perpendicular to the XY plane and parallel to the A1 accelerometer input axis 211. FIG. 8 should be viewed with reference to FIG. 5 which shows that the gyro G1 input axis 111 is parallel to the accelerometer A1 input axis 211, but in which the gyro G1 input axis is displaced in the +X direction. Similarly, the input axis of gyros G2, G4, and G5 are parallel to the input axis of accelerometers A2, A4, and A5, respectively, but are also displaced in the +X direction. The input axis of gyros G6 lies in the XZ plane and is displaced in the −X direction relative to input axis of accelerometer A6 which lies colinear with the +Z axis.

Figure 9:
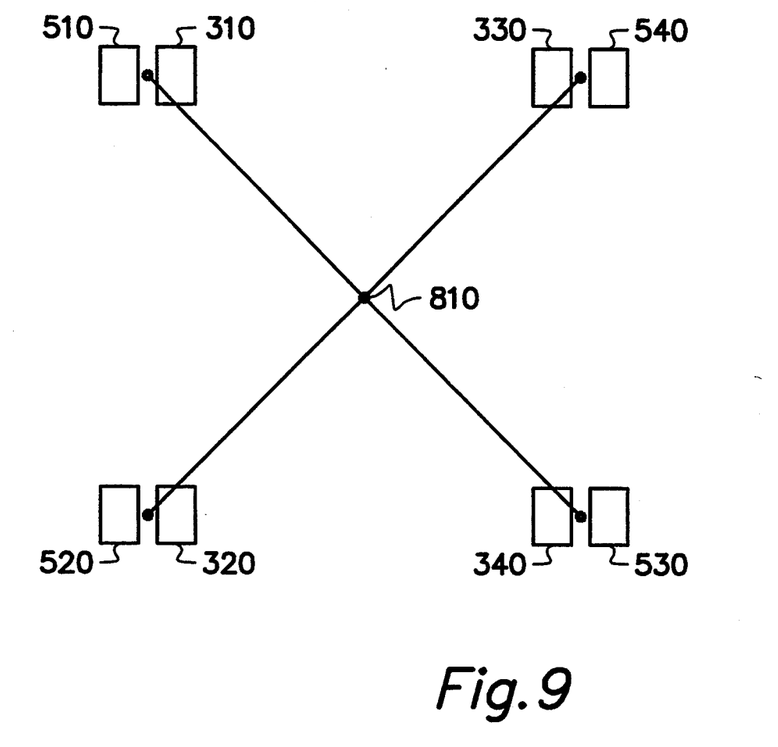
FIG. 9 is a diagrammatic representation of the elastic mounting system in relationship to the center of gravity of the inertial sensor assembly of the present invention.

FIG. 9 illustrates the position of suspension members 510, 520, 530, and 540 mounted to suspension mounting bases 310, 320, 330, and 340 respectively. The four suspension members 510, 520, 530, and 540 are intended to be mounted to structural members (not shown) which in turn are rigidly mounted to a chassis.

As is well understood in the mechanical arts, the spring mass is the suspended mass of the inertial sensor assembly including block 10 and all of the sensors, as well as any other components, mounted thereto. The elastic center of the spring mass is the center of three perpendicular intersecting planes, as is well known, associated with the isolators provided by suspension members 510, 520, 530, and 540. In the present invention, the suspension members 510, 520, 530, and 540 are positioned so that the elastic center 810 is as close as possible to the center of gravity of the mass consisting of the block 10 and all of the gyros and accelerometers mounted thereto, and are intended to lie in a plane passing through the center of gravity of the mass-sensor system. Achievement of positioning the elastic center as the same as the center of gravity of the spring mass system results in, of course, a dynamically stable system in which angular or linear force dampens out to zero.

In the present invention, the block 10 is provided with a plurality of lightening holes 16a–n to reduce the weight of the support frame, namely block 10. Secondly, these holes are positioned and shaped so that the center of gravity lies along the Z axis, and secondly to keep all three axis inertias to approximately the same value. It should be noted that holes 16a–n are only those holes which been identified to enhance understanding the present invention, and that block 10 includes more than those numerically identified.

Figure 3:
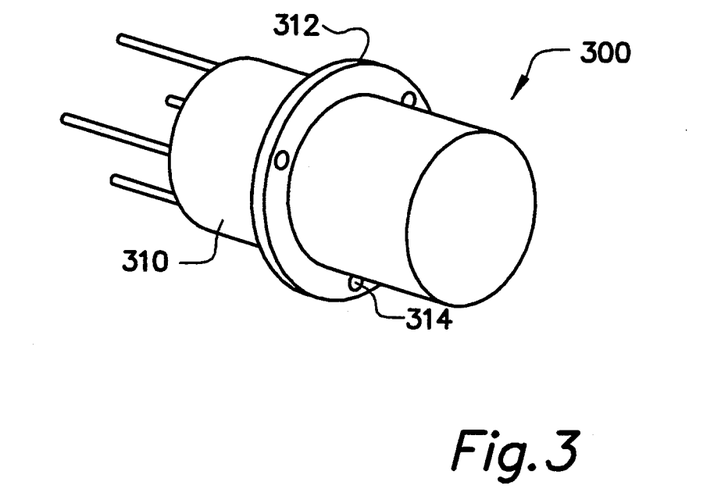
FIG. 3 is diagrammatic representation of an accelerometer housing structure.

The block 10 according to the present invention permits the establishment of high torque ratios of the gyros relative to the spring mass of the assembly including block 10 and the sensors. That is, the gyros are extended at the farthest points away from the center of mass in order to increase moments of inertia, while at the same time minimizing size and weight. On the other hand, the accelerometers are mounted within a space generally surrounded by the mass of block 10 providing the support frame and the mass of all of the gyros, and at the same time being as close to the center of gravity of the mass system consisting of the block 10 and all of the sensors mounted thereto.

it should be understood to those skilled in the art, that the only limitation on placing the accelerometers at the center of gravity is the size of the accelerometer sensor itself. With the accelerometers as illustrated in FIG. 3, the dimensions as particularly given provide for a reasonable fit which permits removal of one accelerometer without the necessity for removing any others. As illustrated in the drawing, the plurality of lightening holes 16a–n are utilized for balancing the values of the moments of inertia of the sensors, particularly the gyros. Lightening holes are, of course, unique only to a particular design incorporating specific gyro sensors and accelerometer sensors.

In a preferred embodiment, it is intended that the selected angles are such that each gyro sensor is angularly spaced from any adjacent gyro by 63.43495°, and that the angle of any accelerometer relative to any adjacent accelerometer is also 63.43495°. In the present invention this is accomplished by selection of the appropriate angles $\theta_1$ being 26.56505°, $\theta_2$ being 144°, and $\theta_3$ being 72°. Having these particular angular displacements provides for optimum inertial sensor reliability and performance as particularly described in the above referred to publications.

While the invention has been described in terms of a preferred embodiment which includes a ring laser gyro having a circular housing, and accelerometers having a cylindrically shaped housing, those skilled in the art will recognize that the invention can be practiced in other environments within the spirit and scope of the appended claims. Moreover, those skilled in the art will recognize that the teachings of the invention may be used with similar advantage with other shape, size and weight sensors than those illustrated.

In accordance with the present invention, a method has been illustrated for configuring 6 gyros and 6 accelerometers in a small compact package. First, the accelerometers are tightly positioned about the XYZ coordinate system as illustrated in FIGS. 5 and 6, having the particular angular relationships. The placement of the accelerometers is selected such that each of the accelerometer sensor center points are equidistant from the accelerometer common intersection point 490. Secondly, the gyro positions are selected such that the input axis of the gyro is parallel to a corresponding accelerometer, and the gyro sensor center point is translated within the XY plane relative to the accelerometer input axis to accommodate the dimensions of the corresponding accelerometer and adjacent gyros. In the preferred embodiment of the invention, it should be appreciated that the three pairs of gyros establish three different intersection points which all lie in the XZ plane, and in which two of the gyro pair intersection points lie in the XZ plane, i.e., on the X axis. Also, within the scope of the present invention, it follows that the input axis of four of the six gyros intersect a common plane in which the input axis of the remaining two of the six gyros lie also in the same common plane.

it should be further appreciated that in practice of the present invention, there exists a substantial plane of symmetry which passes through the combination of the block 10 and the assembly including gyros G1, G2, G3, G4, G5, and G6 and accelerometers A1, A2, A3, A4, A5, and A6.

The embodiments of an invention in which an exclusive property or right is claimed are defined as follows:

1. An inertial sensor assembly comprising:
   a support frame for supporting first, second, third, fourth, fifth, and sixth gyros, the peripheral portions of said support frame surrounding a coordinate reference point of a right hand orthogonal XYZ coordinate system including ±XYZ reference axes passing through said coordinate reference point, and in which said X and Y reference axes define an XY plane, said Y and Z reference axes define a YZ plane, and said X and Z reference axes define an XZ plane;

said first and second gyros being mounted to said support frame and spaced apart from said XY plane in the +Z direction therefrom and spaced apart from said YZ plane in the −X direction therefrom, said first and second gyros having the extension of their respective input axes intersecting at a first intersection point in the XZ plane, and in which said first and second gyro input axes are at a first selected angle relative to said XY plane, and in which the angle value between said +X axis and the perpendicular projection of said first gyro input axis onto said XY plane measure in the counter-clockwise direction is a selected second angle value, and in which the angle between said +X axis and the perpendicular projection of said second gyro input axis on said XY plane measured in the clockwise direction is also said selected second angle value, and wherein said first intersection point is spaced apart from said YZ plane in the +X direction therefrom;

said third gyro being mounted to said support frame and spaced apart from said XY plane in the +Z direction therefrom and spaced apart from said YZ plane in the +X direction therefrom, said third gyro having the extension of its input axis which lies in said XZ plane and is at said first selected angle relative to said XY plane;

said fourth and fifth gyros being mounted to said support frame and spaced apart from said XY plane in the +Z direction therefrom and spaced apart from said YZ plane in the +X direction therefrom, said fourth and fifth gyros having the extension of their respective input axes intersecting at a second intersection point in said XZ plane, and in which said fourth and fifth gyro input axes are at a said first selected angle relative to said XY plane, and in which the angle between said +X axis and the perpendicular projection of said fourth gyro input axis on said XY plane is a third selected angle value measured in the counter-clockwise direction, and in which the angle between said +X axis and the perpendicular projection of said fifth gyro input axis on said XY plane measured in the clockwise direction is also said selected third angle value, and wherein said second intersection point is spaced apart from said YZ plane in the +X direction therefrom; and said sixth gyro being mounted to said support frame and spaced apart from said XY plane in the +Z direction therefrom and slanted apart from said YZ plane in the −X direction therefrom, said sixth gyro having its input axis in parallel with said Z axis and the extension thereof intersecting the extension of said third gyro input axis at a third intersection point, and wherein said third intersection point lies in said XZ plane and is spaced apart from said YZ plane in the −X direction therefrom and spaced apart from said XY plane in the +Z direction therefrom.

2. The apparatus of claim 1 further comprising:
   a first accelerometer being mounted to said support frame and having its input axis parallel to said first gyro input axis and intersecting said Z axis at a fourth intersection point, and in which said fourth intersection point lies in a first reference plane parallel to said XY plane, and in which said first accelerometer is spaced apart from said first reference plane in the +Z direction; and second, third, fourth, fifth, and sixth accelerometers being mounted to said support frame and having their respective input axes parallel to said second, third, fourth, fifth, and sixth gyro input axis, respectively, and said input axis of each of said second, third, fourth, fifth, and sixth accelerometers intersecting said fourth intersection point, and in which said second, third, fourth, fifth, and sixth accelerometers are spaced apart from said fourth reference plane in the +Z direction.

3. The inertial sensor assembly of claim 1 wherein said first selected angle is substantially 26.565°.

4. The inertial sensor assembly of claim 1 wherein said second selected angle is 144° and said third selected angle is 72°.

5. The inertial sensor assembly of claim 3 wherein said second selected angle is 144° and said third selected angle is 72°.

6. The inertial sensor assembly of claim 1 wherein the resultant center of gravity off (i) said support frame, (ii) said first, second, third, fourth, fifth, and sixth accelerometers, and (iii) said first, second, third, fourth, fifth, and sixth gyros mounted thereto lies substantially on said Z axis.

7. The inertial sensor assembly of claim 6 wherein said support frame includes means for mounting four suspension members thereto such that the elastic centers of said suspension members substantially lie in a plane parallel to said YZ plane, and said suspension members are positioned such that the elastic centers thereof are geometrically located as ends of diagonal pairs establishing four corners of a rectangle.

8. The inertial sensor assembly of claim 1 wherein said support frame is constructed in a manner to establish said XZ plane as a substantial plane of symmetry of said support frame with said first, second, third, fourth, fifth, and sixth ones of said gyros and accelerometers mounted thereto.

9. The inertial sensor assembly of claim 1 wherein said support frame comprises a block of a selected material including:
six apertures, each having a mounting means therewith, for mounting said first, second, third, fourth, fifth, and sixth gyros therein, at least in part, and thereby establishing the relationship of each gyro input axis relative to said coordinate system; and
six apertures, each having a mounting means therewith, for mounting said first, second, third, fourth, fifth, and sixth accelerometers therein, at least in part, and thereby establishing the relationship of each accelerometer input axis relative to said coordinate system.

10. The inertial sensor assembly of claim 9 for selecting the moments of inertia about the center of gravity of the mass of said support frame with said first, second, third, fourth, fifth, and sixth ones of said gyros and accelerometers mounted thereto.

11. The inertial sensor assembly of claim 7 wherein said block includes selected apertures therein for causing the elastic center and the center of gravity of the spring mass system, including at least said block and said gyros, to be substantially the same point.

12. An inertial sensor assembly comprising:
a block of material; and
six gyros and six accelerometers mounted to said block such that the input axis of each gyro and accelerometer is in non-colinear alignment with any other input axis, and first, second, and third pairs of gyros of said six gyros intersect at a common gyro intersection point exclusive of one another, and such that each input axis of all six of said accelerometers intersect at a common accelerometer intersection point, and wherein said three gyro intersection points and said accelerometer intersection point lie in a plane which is substantially a plane of symmetry of the combination of said block and said six gyros and said six accelerometers.

13. An inertial sensor assembly comprising:
a block of material; and
six gyros mounted to said block such that the input axis of each gyro is in non-colinear alignment with any other input axis, and the input axes of each of first, second, and third pairs of gyros of said six gyros intersect at first, second, and third gyro intersection points exclusive of one another, and wherein said first, second, and third gyro intersection points lie in a plane.

14. The inertial sensor assembly of claim 13 where said first, second, and third gyro intersection points lie in a plane which is substantially a plane of symmetry of the combination of said block and said six gyros.

15. An inertial sensor assembly comprising:
a block of material; and six gyros mounted to said block such that the input axis of each gyro is in non-colinear alignment with any other input axis, and first, second, third and fourth ones of said gyros having their respective input axis intersecting a common plane, and in which the input axis of fifth and sixth ones of said gyros lie in said common plane.

16. The inertial sensor assembly of claim 15 where said common plane is substantially a plane of symmetry of the combination of said block and said six gyros.

* * * * *